May 25, 1937.  G. M. LANE  2,081,545
VEHICLE BODY CONSTRUCTION
Filed Jan. 14, 1935  2 Sheets-Sheet 1
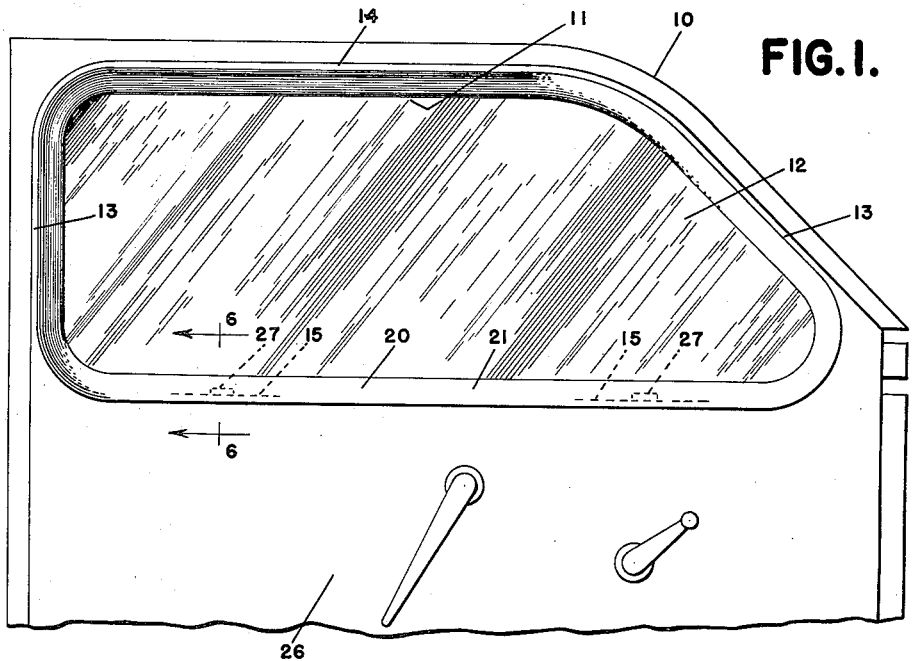
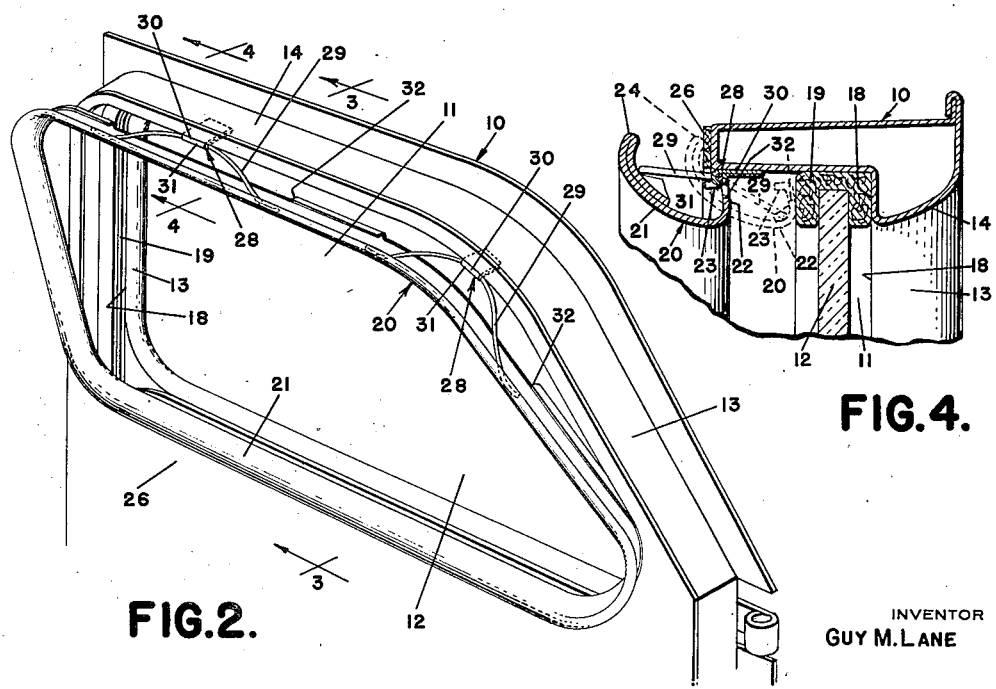
INVENTOR
GUY M. LANE
ATTORNEYS May 25, 1937.　　　　　G. M. LANE　　　　　2,081,545
VEHICLE BODY CONSTRUCTION
Filed Jan. 14, 1935　　　2 Sheets-Sheet 2
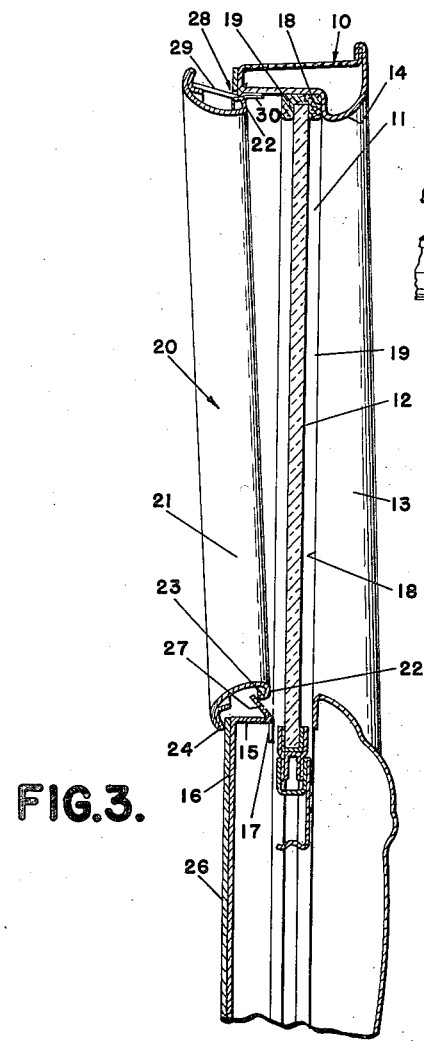
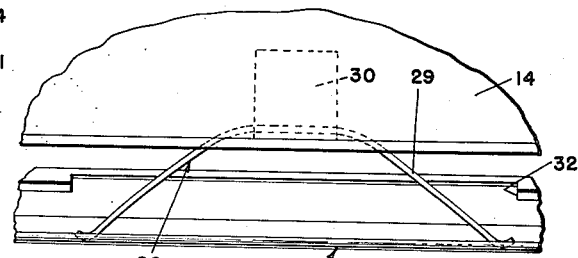
FIG.5.
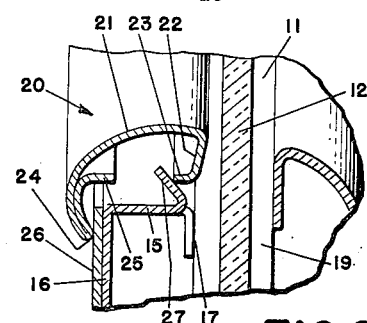
FIG.6.
FIG.7.
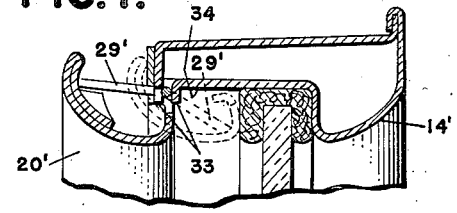
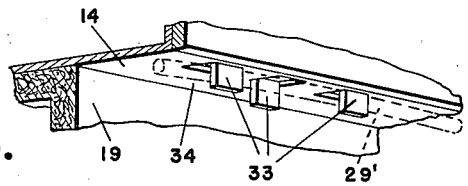
FIG.8.
INVENTOR
GUY M. LANE
ATTORNEYS Patented May 25, 1937

2,081,545

UNITED STATES PATENT OFFICE 2,081,545

VEHICLE BODY CONSTRUCTION

Guy M. Lane, Detroit, Mich., assignor to Motor Products Corporation, Detroit, Mich., a corporation of New York Application January 14, 1935, Serial No. 1,742

13 Claims. (Cl. 296—44)

This invention relates generally to vehicle bodies and refers more particularly to improvements in the means for securing garnish molding frames in assembled relation to the window openings of the body.

One of the principal objects of this invention is to simplify, render more efficient, and appreciably reduce the cost of manufacture of vehicle bodies by providing attaching means for the molding frame surrounding the window opening in the body distinguished by the expedient manner in which the same operates to securely fasten moldings of widely varying cross sectional contour to vehicle body structure of different configuration.

The present invention contemplates simplifying and materially expediting assembly by providing fastening means for securing the molding frame on the body structure, permitting the former to be snapped into firm engagement with the latter by merely effecting a relative movement of the molding and body structure toward each other. In accordance with this invention, the snap engagement between the body structure and molding is such as to permit the latter to be readily removed from the former when desired.

Another object of this invention, which contributes materially to reducing the cost of manufacture, resides in the provision of attaching means for the molding on the body capable of compensating for relatively wide manufacturing inaccuracies and, as a consequence, renders it unnecessary to work to such close limits in forming the molding.

A further advantageous feature of this invention resides in the provision of a cam surface engageable with a portion of one longitudinal side of the molding prior to snapping the same into engagement with the body structure, and so designed as to effect a wedging engagement with the side aforesaid of the molding when the latter is snapped into engagement with the body structure. As will be presently described, the cam surface effects a slight vertical displacement of the molding frame in the plane of the latter during the attaching operation and thereby compensates for variations in the height of the molding frame. In cases where the cam action is effected at the lower side of the molding frame, this cam action functions to firmly clamp the upper edge portion of the trimming material between the body structure and the adjacent lower marginal edge of the molding.

The foregoing, as well as other objects, will be made more apparent as this description proceeds, especially when considered in connection with the accompanying drawings, wherein:

Figure 1 is a side elevational view of a portion of a vehicle body equipped with a garnish molding frame secured in place in accordance with this invention;

Figure 2 is a fragmentary perspective view of the construction shown in Figure 1, illustrating the garnish molding frame in the position the latter assumes just prior to snapping the same into engagement with the body structure;

Figure 3 is a vertical sectional view through the construction shown in Figure 2;

Figure 4 is a cross sectional view taken substantially on the plane indicated by the line 4—4 of Figure 2, and illustrating the two positions of the molding frame with respect to the body structure;

Figure 5 is a fragmentary enlarged plan view of a portion of the construction shown in Figure 2;

Figure 6 is a cross sectional view taken on the line 6—6 of Figure 1;

Figure 7 is a view similar to Figure 4, showing a slightly modified form of construction; and Figure 8 is a fragmentary perspective view of the construction shown in Figure 7.

Referring now more in detail to the drawings, it will be noted that there is illustrated in Figure 1 a portion of a vehicle body 10 having a window opening 11 therethrough normally closed by a glass panel 12 and surrounded by suitable body structure. In detail, the front and rear sides of the window opening 11 are formed by the pillars 13 and the top of the window opening is defined by a suitable header 14 integrally connected to the upper ends of the pillars 13 to form, in effect, a continuation of the latter. The lower side of the window opening is formed by a flange 15 extending laterally outwardly from the upper marginal edge of the innermost body panel 16 and having a downwardly extending stiffening flange 17 at the free edge thereof.

In accordance with conventional practice, the pillars 13 and header 14 are fashioned to form a continuous shoulder 18 extending into the window opening 11 and forming an abutment for the usual glass retaining channel 19. The construction is such as to permit the retainer 19 to be inserted into the window opening 11 from the inner side of the latter, and in the present instance the retainer is concealed from the inner side of the window opening by a garnish molding frame 20 corresponding in shape to the contour of the window opening.

The particular cross sectional contour of the molding selected herein for the purpose of illustrating this invention is clearly shown in Figure 6 of the drawings, although it is to be understood that the present invention is by no means limited to the specific contour shown in this figure. By reference to Figure 6, it will be noted that the molding selected for the purpose of illustrating the invention comprises a transversely curved body portion 21 having a flange 22 extending vertically outwardly from the lateral outer edge of the body portion 21 and having a stiffening flange 23 extending laterally inwardly from the free edge of the flange 22. The opposite edge portion of the body portion 21 is return-bent to form the rounded marginal edge 24 and the return-bent portion terminates in a laterally outwardly extending stiffening flange 25. It will also be apparent from Figures 4 and 6 that when the molding 21 is in assembled relation with the body in the window opening 11, the marginal edge portion 24 engages the trimming material 26 for clamping the latter to the innermost body panel 16, and the flange 22 abuts the lateral inner side of the retainer 19. It will also be observed, particularly from Figure 6, that the free marginal edge of the flange 23 has a wedging engagement with the upper surfaces of cam members 27, formed by severing portions of the depending flange 17 and bending the portions upwardly, in the manner clearly illustrated in Figure 6, to provide laterally inwardly inclined flexible cams for engagement with the free marginal edge of the stiffening flange 23 on the molding.

As previously stated, the molding frame 20 is secured in assembled relation to the window opening by snapping the same into engagement with the body structure adjacent the window opening. In the present instance, provision is made for snapping the upper portion of the molding frame 20 into firm engagement with the header 14 by two fastening devices indicated generally in Figure 2 by the reference character 28. In detail, each of the fastening devices 28 is in the form of a strip 29 of spring wire and in the embodiment of the invention illustrated in Figures 1 to 6 inclusive, the two strips of spring wire are rockably supported upon the header 14. As will be observed from Figure 4, the strips of spring wire are secured in place by means of hinge parts 30 fixedly secured to the underside of the header 14 laterally inwardly beyond the glass retainer 19 and having looped portions 31 located adjacent the inner edge of the header for receiving the spring wire strips 29. By reference to Figure 2, it will be observed that the fastener elements 28 are spaced from each other longitudinally of the header 14 and are normally bowed laterally outwardly with respect to the plane of the molding frame 20.

With the construction as thus far described, it will be noted that when it is desired to secure the molding frame 20 in place the lower section of the frame is positioned in the manner shown in Figure 3 with the free marginal edge of the stiffening flange 23 in engagement with the cams 27 and with the lower portion of the marginal edge 24 in abutting relation to the adjacent panel of trimming material 26. The spring wire strips 29 are then properly adjusted to provide for engagement of the free ends thereof with the transversely curved body portion of the molding frame in the manner shown in Figure 3, whereupon a force is exerted on the upper portion of the molding frame 20 tending to move the latter portion in a direction toward the header 14. As soon as this force exceeds the resistance to the aforesaid movement of the molding frame by the spring wire strips, the latter will tend to straighten and, in so doing, the free ends of the same will be cammed downwardly by the transverse curvature of the body portion 21 of the molding frame until the same pass to the outer side of a vertical plane extending through the axis of rocking movement of the wire strips, whereupon the latter, in attempting to assume their normal bowed positions, snap the upper portion of the molding frame into the dotted line position thereof shown in Figure 4. In this latter position of the molding frame the marginal edge portion 24 is secured under tension to the inner side of the body structure immediately surrounding the window opening 11, and the flange 22 on the molding frame is clamped to the retainer 19. It may be pointed out at this time that the portions of the marginal flange 25 adjacent the hinge parts 30 are flattened in the manner shown in Figure 4 to provide sufficient clearance for the hinge parts when the molding frame is in assembled relation with the body to permit the wire strips 29 to more nearly approach a horizontal plane extending through the axis of the hinge parts 30 when the wire fasteners are in their operative positions shown in Figure 4. With the particular type of molding shown herein for the purpose of illustration, it is desirable to form slots 32 in the flange 22 opposite the flattened portions aforesaid of sufficient depth to permit initially positioning the spring wire strips in the manner shown in Figure 3 with the extremities thereof in engagement with the transversely curved portion 21 of the molding adjacent the marginal edge 24 thereof.

As the upper portion of the molding frame 20 is snapped into engagement with the adjacent body structure, the lower section of the molding, and particularly the stiffening flange 23 thereof, rides downwardly upon the cams 27 into wedging engagement therewith. Due to the fact that the cams possess a certain amount of flexibility, the wedging engagement aforesaid will place the cams under tension and in so doing will secure the lower section of the molding frame to the body structure. Obviously, this construction will compensate for appreciable manufacturing inaccuracies, particularly in the height of the molding frame 20, which is perhaps the most difficult dimension to maintain in forming the molding. Moreover, due to the inclination and flexibility of the cams, the lower marginal edge portion 24 of the molding frame is yieldably clamped to the adjacent portion of the inner body panel by the cams.

The modified form of construction illustrated in Figures 7 and 8 differs from the one previously described, only insofar as the manner in which the spring wire fasteners 29' are held in assembled relation with the header 14'. In this embodiment of the invention the spring wire fasteners 29' are positioned with reference to the header 14' by merely inserting the central portions of the fasteners between depending fingers 33 struck out from the lower wall 34 of the header 14' in the manner clearly shown in Figure 8. In the specific embodiment of the invention featured in the latter figure, three fingers are employed in connection with each of the wire fasteners 29', and these fingers are so positioned with respect to each other that two of the fingers cooperate in taking the stress of each of the wire fasteners 29' when the molding frame 20' is assembled with the body.

Thus from the foregoing, it will be observed that I have provided a relatively simple and inexpensive method of securing molding frames in assembled relation with the vehicle body structure. It will also be observed that with my improved construction previously described, relatively large manufacturing inaccuracies are compensated for without interfering with the assembly or detracting from the appearance of the construction. In addition, it will be understood that the method employed for snapping the molding into assembled relation with the body not only provides for securely fastening the molding to the body, but also permits the molding to be readily removed from the body structure.

Although either of the two specifically described embodiments of the invention may be employed in the manufacture of a vehicle body with the minimum expense, nevertheless, it is to be understood that certain or all of the foregoing features may be realized with constructions differing in details from the present embodiments of the invention. For example, the cam surfaces 27 may be associated with the header 14 and the snap fastening devices may be assembled upon the body structure adjacent the lower side of the window opening 11 for cooperation with the lower section of the molding frame to secure the latter in assembled relation with the body. Moreover, the snap fastening devices may be mounted upon the molding frame in such a manner that the free edges thereof engage the body structure to effect the desired results. In addition, the cams 27 previously described, may be eliminated and replaced by snap fastening devices operating in a manner similar to those defined above to effectively secure the molding frame to the body structure. In view of the numerous different types of constructions available to secure the advantageous results contemplated by the present invention, reservation is made to make such changes in the construction as may come within the purview of the accompanying claims.

What I claim as my invention is:

1. In a vehicle body having a window opening in one side thereof and having body structure adjacent the opening, a molding frame for the window opening, means for securing one side of the molding frame at one side thereof in wedging relation to a portion of the body to prevent horizontal displacement of the frame, and cooperating engaging means on another side of the molding frame and associated body structure permitting the molding frame to shift relative to the window opening as the same is secured by the aforesaid means and also operable to prevent horizontal and vertical displacement of the frame.

2. In a vehicle body having a window opening in one side thereof and having structure adjacent the opening, a molding frame for the window opening provided with a portion at one side of the opening having a snap engagement with the structure adjacent the opening, and cooperating engaging means on the opposite side of the molding frame and structure adjacent thereto permitting the molding frame to shift in its plane as the portion aforesaid is snapped into engagement with the adjacent structure and operable to secure the latter side of the molding frame to the structure in the position this side assumes after the snap engagement.

3. In a vehicle body having a window opening in one side thereof and having body structure adjacent the opening, a molding frame for the window opening, cooperating engaging cam means on one side of the molding frame and adjacent body structure providing a fulcrum for the frame, and a fastening device at the opposite side of the molding frame operable to snap the latter side in place upon moving this side toward the body structure, said cam means permitting the molding frame to adjust itself in the window opening upon snapping the first named side of the molding frame in place and further operable to establish a wedging engagement between the second named side of the molding frame and adjacent body structure in the position the latter side naturally assumes after the snap engagement aforesaid.

4. In a vehicle body having a window opening in one side and having body structure adjacent the opening, a molding frame for the opening, cooperating engaging means on one side of the molding frame and adjacent body structure providing a fulcrum for the molding frame, and a fastening device interposed between the opposite side of the molding frame and adjacent body structure operable to snap the latter side of the molding frame in place upon swinging said latter side toward the body structure.

5. In a vehicle body having a window opening in one side thereof and having a frame member defining one side of the window opening, a molding for the window opening also having a frame member, means for securing the molding to the body including a bowed spring metal element rockably supported intermediate its ends on one of the aforesaid members and having the extremities thereof engageable with the other of said members whereby movement of the molding frame member toward the body frame member compresses the spring metal element and effects a rocking movement of the latter in a direction to move the extremities of the element across the vertical plane including the axis of rocking movement of said element permitting the ends of the latter to spring laterally outwardly with respect to the axis of rocking movement, and means on the molding frame member for engagement with the ends of the spring element upon movement of said ends in the latter direction for snapping the molding frame member in place.

6. In a vehicle body having a window opening in one side thereof and having a body structure adjacent the opening, a molding frame for the window opening having a transversely curved portion, means for securing the molding frame in position relative to the opening including a bowed spring metal member rockably supported intermediate its ends on the body structure and having the extremities engageable with the transversely curved portion of the molding adjacent the outer marginal edge thereof whereby movement of said molding portion toward the body structure compresses the spring metal member and effects a rocking movement of the latter in a direction to move the extremities along the transversely curved portion of the molding across a vertical plane including the axis of rocking movement of said member whereupon said ends suddenly move toward the body structure, and means upon the molding engageable with the extremities upon movement of the latter toward the body structure for snapping the molding in place.

7. In a vehicle body having a window opening in one side thereof and having a frame member defining one side of the window opening, a molding member for the opening, means for securing the molding in position relative to the opening including a bowed spring metal element rockably supported intermediate its ends on one of the aforesaid members and having the extremities engageable with the other of said members whereby relative movement of the members toward each other places the element under tension and causes the extremities of the element to snap the molding frame member into position relative to the opening.

8. In a vehicle body having a window opening in one side and having a body structure adjacent the opening, a member extending into the opening, a molding frame for the opening having a portion at one side adapted to engage said member, means operable in dependence upon movement of the molding frame toward the opening to snap the aforesaid side portion of the molding frame into engagement with the member, and means responsive to said snap engagement for wedging the opposite side of the molding into abutting relation with said member and said body to prevent horizontal displacement of said frame.

9. In a vehicle body having a window opening in one side thereof and having a member extending into the opening, a molding frame for the window opening having a portion engageable with said member upon movement of the molding frame toward the window opening, and a yieldable fastener element mounted for rocking movement about an axis extending parallel with the plane of said opening from a position without the opening into the opening and effective upon said movement to snap the portion aforesaid of the frame into engagement with said member.

10. In a vehicle body having a window opening in one side thereof, a molding for the window opening, means for securing the molding in position relative to the window opening upon movement of the molding toward the opening including a spring fastener element supported intermediate its ends on one side of the window opening for rocking movement and having the free end portions engageable with the molding.

11. In a vehicle body having a window opening in one side and having body structure adjacent the opening, a molding frame for the opening, means for securing one side of the molding frame in position relative to the opening and operable to cause the molding frame to shift in a direction toward the opposite side of the frame, and means effective upon the aforesaid shifting movement of the molding frame to secure the latter side of the frame in vertical and horizontal abutting relation to the body structure adjacent thereto to prevent displacement of the frame.

12. In a vehicle body having a window opening in one side and having body structure adjacent the opening, a molding frame for the opening, a fastening device interposed between one side of the molding frame and adjacent body structure operable to snap the latter side of the molding frame into position relative to the opening upon movement of the molding frame toward the opening, said fastening device operable to cause a shifting movement of the molding frame in a direction toward the opposite side of the molding frame, and means effective upon the aforesaid shifting movement of the molding frame to secure the last named side of the frame in vertical and horizontal abutting relation to the body structure adjacent thereto to prevent displacement of the frame.

13. In a vehicle body having a window opening in one side and having body structure adjacent the opening, a molding frame for the opening, means for securing one side of the molding frame in position relative to the opening, and means fixed to the body structure at the opposite side of the molding frame and effective upon securing the first named side in position to draw the last mentioned side of the molding frame inwardly of the window opening and secure the front side of the molding frame in abutting relation vertically and horizontally to the body structure to prevent displacement of the frame.

GUY M. LANE.